US008640981B2

(12) United States Patent
McDonough

(10) Patent No.: US 8,640,981 B2
(45) Date of Patent: Feb. 4, 2014

(54) REELS WITH CORRUGATED FLANGES AND UNDERCUTS

(75) Inventor: James McDonough, Bradford, PA (US)

(73) Assignee: Carris Reels, Inc., Proctor, VT (US)

( * ) Notice: Subject to any disclaimer, the term of this patent is extended or adjusted under 35 U.S.C. 154(b) by 262 days.

(21) Appl. No.: 13/013,451

(22) Filed: Jan. 25, 2011

(65) Prior Publication Data

US 2011/0204176 A1     Aug. 25, 2011

Related U.S. Application Data

(60) Provisional application No. 61/307,174, filed on Feb. 23, 2010.

(51) Int. Cl.
*B65H 75/14* (2006.01)

(52) U.S. Cl.
USPC .......................................... 242/614

(58) Field of Classification Search
CPC ................. B65H 75/14; B65H 75/145; B65H 2701/512; B65H 2701/5122
USPC .............................. 242/614–614.1
See application file for complete search history.

(56) References Cited

U.S. PATENT DOCUMENTS

| | | | |
|---|---|---|---|
| 1,911,427 A | 5/1933 | Bureau | |
| 2,944,757 A * | 7/1960 | Morin | 242/118.4 |
| 3,563,487 A | 2/1971 | Starratt | |
| 4,471,919 A | 9/1984 | Leunig | |
| 5,833,160 A | 11/1998 | Enomoto et al. | |
| 6,991,197 B2 * | 1/2006 | Cox et al. | 242/614.1 |
| 2001/0035476 A1 | 11/2001 | Ripplinger | |

FOREIGN PATENT DOCUMENTS

| | | |
|---|---|---|
| EP | 1733989 A1 | 12/2006 |
| FR | 2327183 A1 | 5/1977 |
| JP | 9001602 A | 1/1997 |
| JP | 2003212441 A | 7/2003 |

OTHER PUBLICATIONS

Machine Translation of JP 9-1602 A.*
Partial European Search Report issued in connection with the corresponding European Patent Application No. 11003813.0 on Nov. 7, 2011.
Translated Abstract for JP 9001602.
Translated Abstract for JP 2003212441.
Translated Abstract of EP 1733989.
Extended European Search Report issued in connection with the corresponding European Patent Application No. 11003813.0 on Mar. 15, 2012.

* cited by examiner

*Primary Examiner* — William E Dondero
(74) *Attorney, Agent, or Firm* — The H.T. Than Law Group

(57) ABSTRACT

Reels or spools for carrying wires or the likes, where the flanges of these reels or spools have corrugations with undercuts selectively formed thereon, are provided. These undercuts may aid in the molding process, such as injection molding or compression molding with substantially rigid molds, among other things. The reels or spools may also have supports dispersed between the corrugations to provide additional structural integrity to the flange. These supports can be mid-plane supports between the corrugations and may be positioned closer to the inside surface or to the outside surface of the flange, and the supports may form an angle with the corrugations.

17 Claims, 10 Drawing Sheets

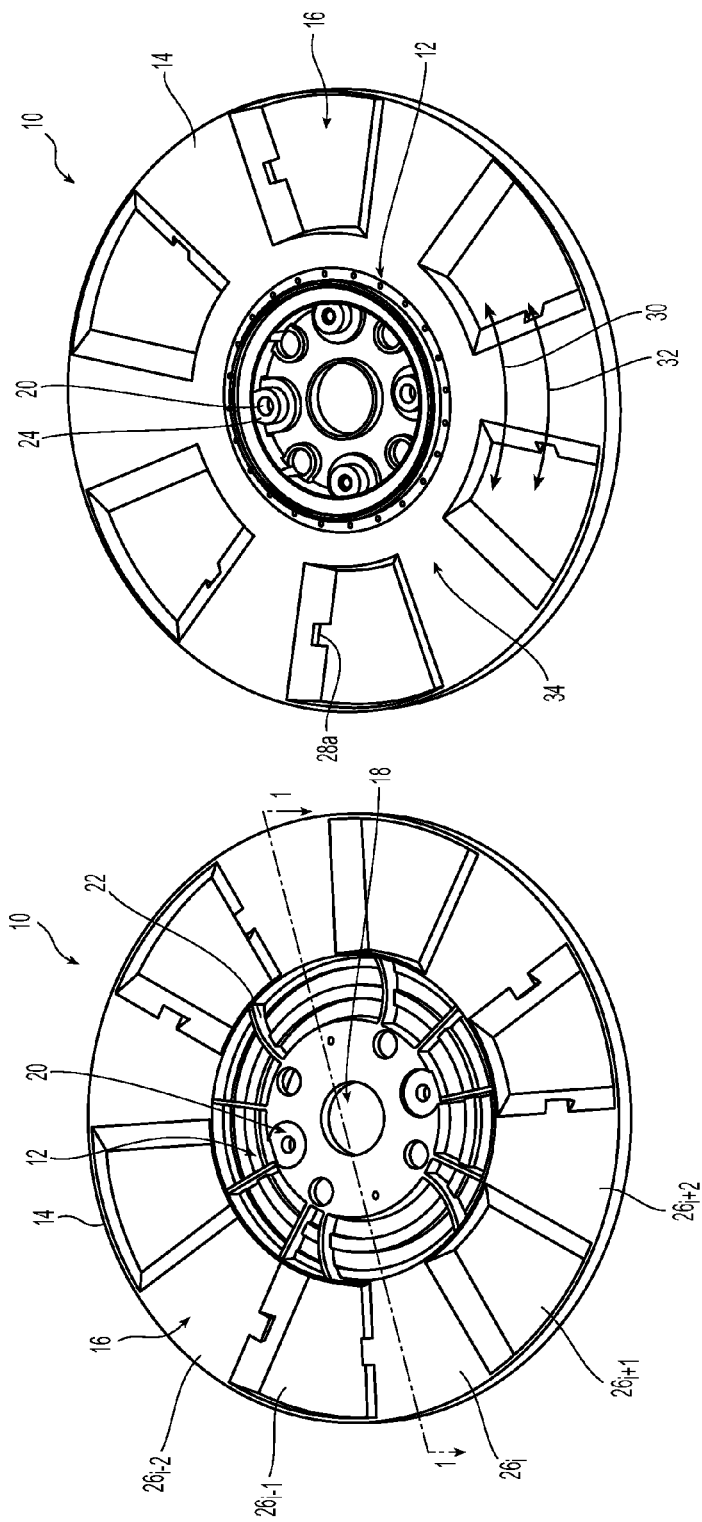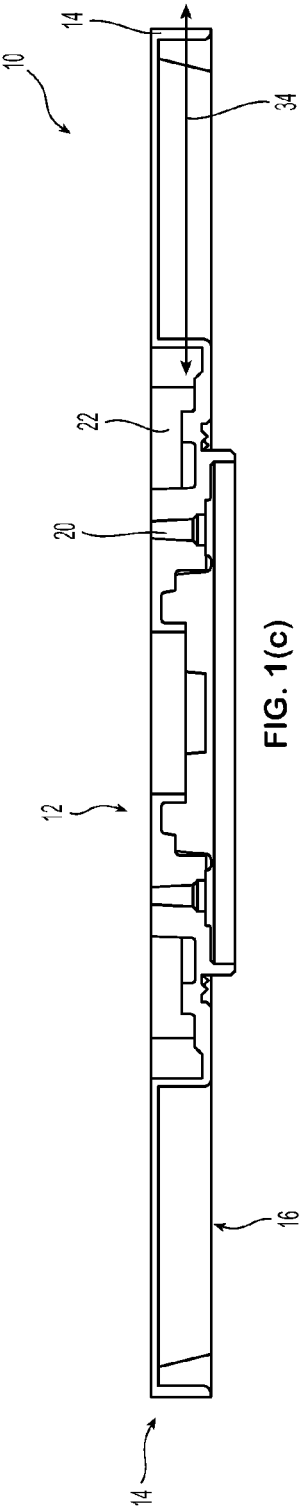
FIG. 1(a)
FIG. 1(b)
FIG. 1(c)

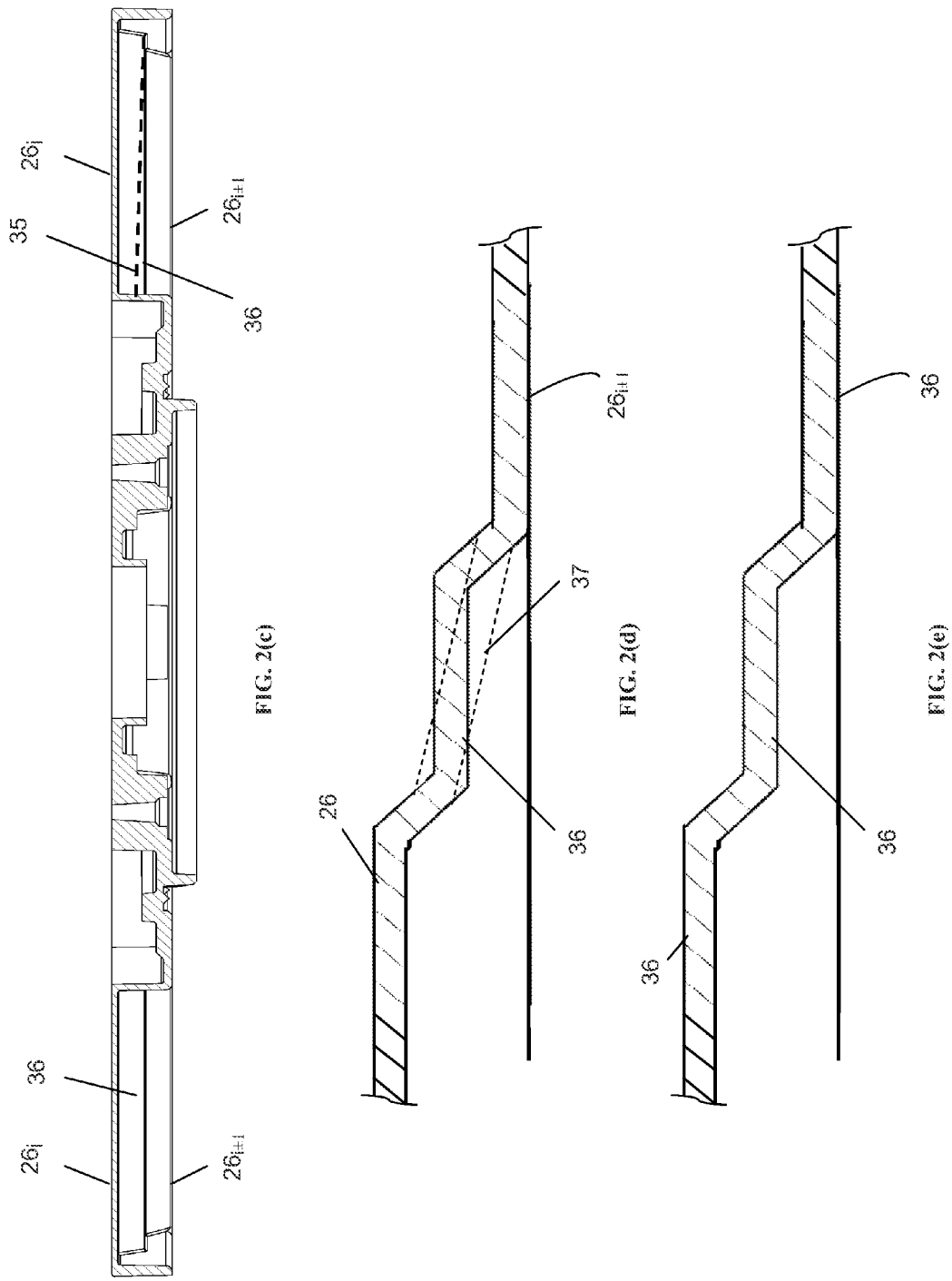

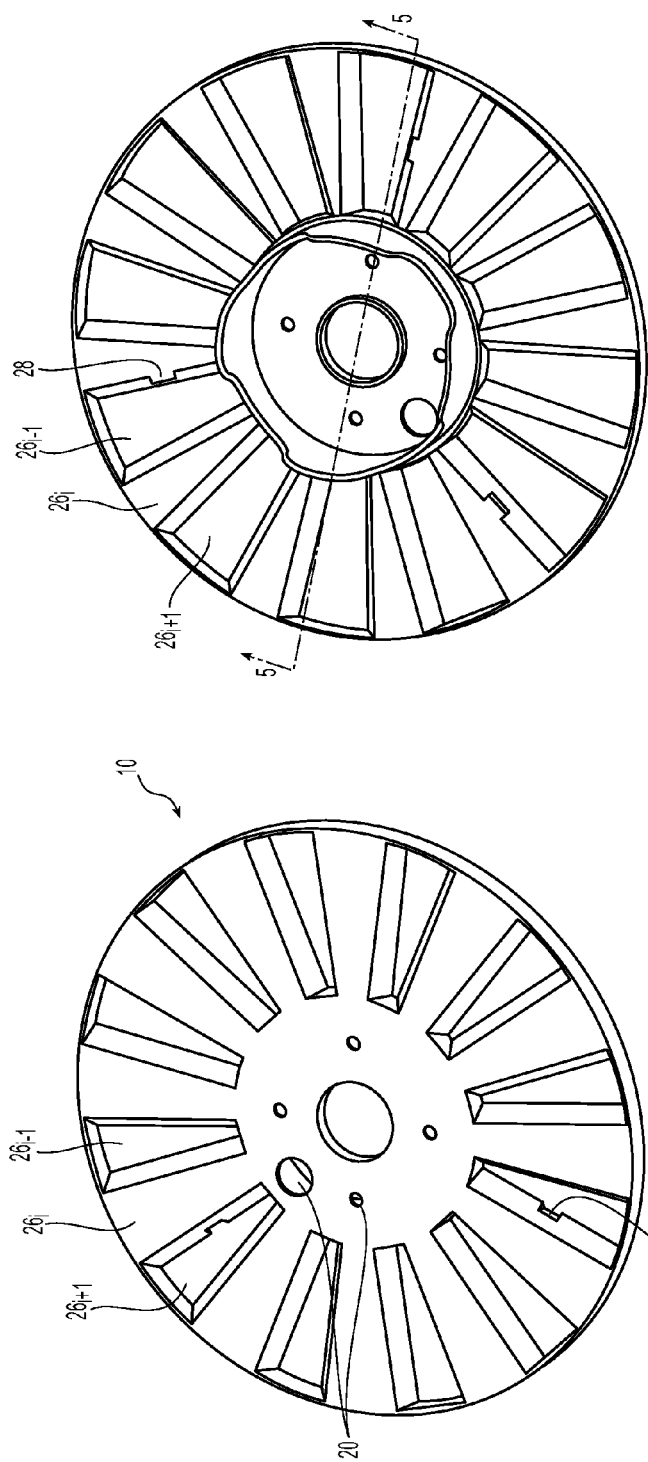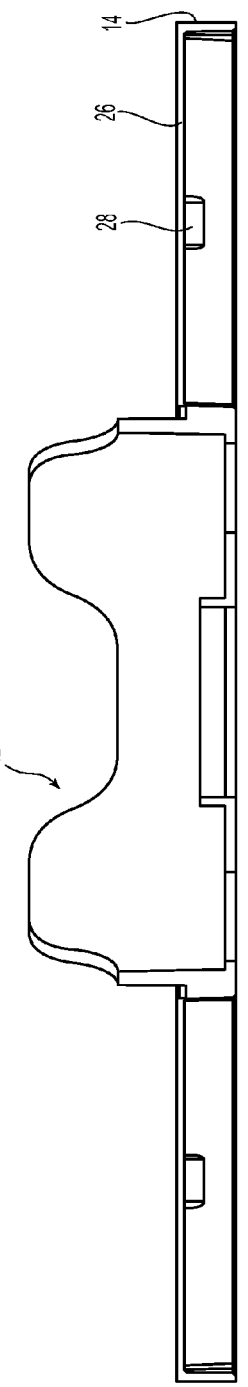
FIG. 5(a)
FIG. 5(b)
FIG. 5(c)

REELS WITH CORRUGATED FLANGES AND UNDERCUTS

CROSS REFERENCE TO RELATED APPLICATION

The present application claims priority to commonly-owned U.S. provisional application 61/307,174 filed on Feb. 23, 2010, which is incorporated by reference herein its entirety.

FIELD OF THE INVENTION

This invention generally relates reels or spools designed to carry wires, such as electrical, telephone or communication wires, other stranded materials, or the like, and more specifically to corrugated flanges for these reels or spools having undercuts formed thereon.

BACKGROUND OF THE INVENTION

Corrugated flanges for spools and reels are known for a long time. Exemplary of such flanges are disclosed in U.S. D281,482 to Suzuki et al, U.S. Pat. No. 3,565,363 to Mizuguchi et al., U.S. Pat. No. 5,474,254 to Faulkner, U.S. Pat. Nos. 1,911,427, 5,169,086, U.S. D330,506, U.S. Pat. Nos. 2,597,139, 4,512,532 and 6,450,441, among others. These references are incorporated herein by reference in their entireties. Corrugations and ribs are added to the flanges to provide the flanges with more structural integrity, among other properties.

However, the prior art does not contemplate adding undercuts to the flanges or more particularly to the corrugations on the flanges.

SUMMARY OF THE INVENTION

Hence, the present invention is directed to reels or spools for carrying wires or the likes, wherein the flanges of these reels or spools have corrugations with undercuts selectively formed thereon. These undercuts may aid in the molding process, such as injection molding or compression molding with substantially rigid molds, among other things.

The present invention may also have supports dispersed between the corrugations to provide additional structural integrity to the flange. These supports can be mid-plane supports between the corrugations and may be positioned closer to the inside surface or to the outside surface of the flange, and the supports may form an angle with the corrugations.

BRIEF DESCRIPTION OF THE DRAWINGS

In the accompanying drawings, which form a part of the specification and are to be read in conjunction therewith and in which like reference numerals are used to indicate like parts in the various views:

FIG. 1(a) is an isometric outside view of an inventive flange of the present invention; FIG. 1(b) is an isometric inside view of the inventive flange of FIG. 1(a); and FIG. 1(c) is a cross-sectional view along line 1-1.

FIG. 2(c) is a cross-sectional view along line 2-2; FIG. 2(d) is a partial cross-section showing corrugations 26 and 26i and a radial support 36, 37 in between; FIG. 2(e) is a partial cross-sectional view in a radial direction of an alternate embodiment of a support shown in FIGS. 2(a)-(c);

FIG. 5(a) is an outside isometric view of another inventive flange of the present invention; FIG. 5(b) is an inside isometric view of the inventive flange of FIG. 5(a); and FIG. 5(c) is a cross-sectional view of the along line 5-5.

DETAILED DESCRIPTION OF THE PREFERRED EMBODIMENTS

Figure 1D:
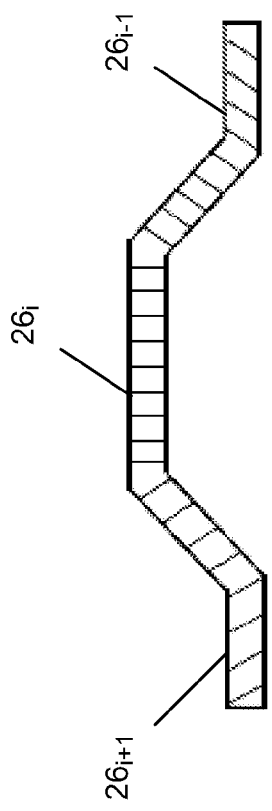
FIG. 1(d) is a partial cross-sectional view of a portion of the inventive flange along line 30.

As illustrated in the accompanying drawings and discussed in detail below where like parts are designated by like referenced numbers, the present invention is directed to flange 10 for use with reels or spools. Generally, a tube is connected to one flange 10 at each end, and wires are wounded on the tube and contained by flanges 10. FIGS. 1(a), 2(a), 3(a), 4(a), 5(a), 5(d), 6(a) and 6(d) show the outside views of the flanges, i.e., the side away from and not contacting the wires, and FIGS. 1(b), 2(b), 3(b), 4(b), 5(b), 5(e), 6(b) and 6(e) show the inside views, i.e., the side contacting the wires.

Referring to FIGS. 1(a)-(c), flange 10 comprises hub or core 12, outer rim 14 and side wall 16. Hub 12, as best shown in FIGS. 1(b)-(c) is sized and dimensioned to receive a tube (not shown), where the wire or other stranded objects are wound. A reel or spool formed by attaching a flange on each end of a tube is well known in the art. Hub 12 can have any features, including arbor 18 and one or more apertures 20 to fasten to the tube. Alternatively, screws and nuts can be used to fasten two flanges 10 together through apertures 20 with the tube disposed therebetween. Any number of apertures 20 can be used. Hub 12 may have ribs 22 for structural support and bosses 24 to support apertures 20. Hub 12 may also have corrugations, ribs, spokes, or any other conventional features, and hub 12 can have any diameter suitable for the wires to be wound. The present invention is not limited to any particular hub design.

In accordance with an aspect of the present invention, side wall 16 comprises a plurality of corrugations, hereinafter collectively as corrugations 26 and individually as corrugation(s) 26($i$±n), where n≥0. Preferably, corrugations 26 are arranged in an alternate fashion, e.g., corrugation 26($i$) protrudes to the outside of flange 10; adjacent corrugations 26($i$±1) are protruding to the inside; and their adjacent corrugations 26($i$±2) are again protruding to the outside, and so on. Flange 10 can have an even or odd number of corrugations 26. Flange 10 preferably has a number of undercuts 28 formed on the side of one or more corrugations 26. As shown, undercuts 28 are present in opposing pairs and are preferably evenly distributed circumferentially around flange 10. Three (3) pairs of opposing undercuts 28a and 28b are shown in FIGS. 1(a)-(b) arranged about 120° apart on selected corrugations; however, any number of undercuts, single or pairs, can be used. Also as shown, undercuts 28a and 28b are positioned about midway on the selected corrugations in the radial direction; however, the present invention is not so limited. Undercuts 28a or 28b can be placed at any location along the radial direction. Furthermore, the undercut pair can be offset to each other instead of directly opposite to each other. In other words, undercut 28a and 28b be positioned at different radial positions from each other.

Figure 1E:
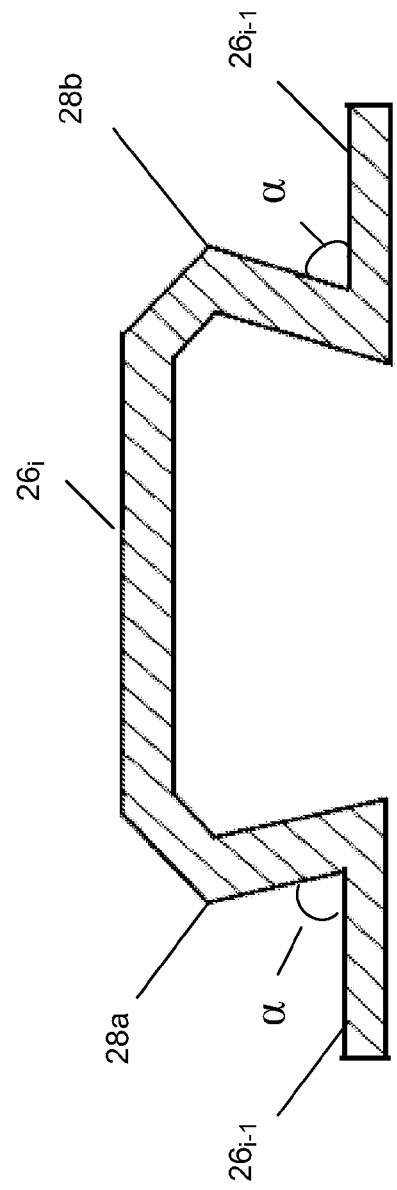
FIG. 1(e) is a partial cross-sectional view of a portion of the inventive flange along line 32 to show the undercuts on selected corrugations.

To complement undercuts 28, the cross-section of corrugations 26 along the circumferential direction has preferably a trapezoidal shape along line 30 in FIG. 1(b) and best shown in FIG. 1(d). The cross-section of corrugations 26 along undercuts 28 along line 32 in FIG. 1(b) and best shown in FIG. 1(e) shows that undercut 28 forms a closed angle α with corrugation 26(i+1) and 26(i−1). Angle α is less than 90°, and is preferably about 75° or more, preferably about 80° or more, and more preferably about 85° or more. In other words, undercut 28 is about 15°, preferably 10°, and more preferably 5° away from a line vertical to corrugation 26(i). Angle α is selected in relation to the flange's thickness or the flange material's flexibility. In other words, angle α may be smaller if the flange is thinner or if its material is more flexible. A flange designer may choose an angle α or an undercut in accordance with the present invention.

An advantage of using undercut 28 is that during a molding process, including injection molding or compression molding, using substantially rigid molds, when the mold halves are separated the molded flange will remain on a predetermined mold half. For example, referring to FIG. 1(e), during the ejection step after the molten or soften plastics have partially solidified the partially solidified flange 10 remains attached to the mold half that is located immediately to the bottom of it due to the closed nature of undercuts 28. Due to the fact that flange 10 is still hot and flexible, it can be removed from said mold half by one or more ejection pins or ejection mechanisms located proximate to the undercuts. Preferably, undercuts 28 or undercut pairs 28a and 28b are evenly distributed around flange 10, as discussed above, to balance flange 10 on the selected mold half.

Figure 2B:
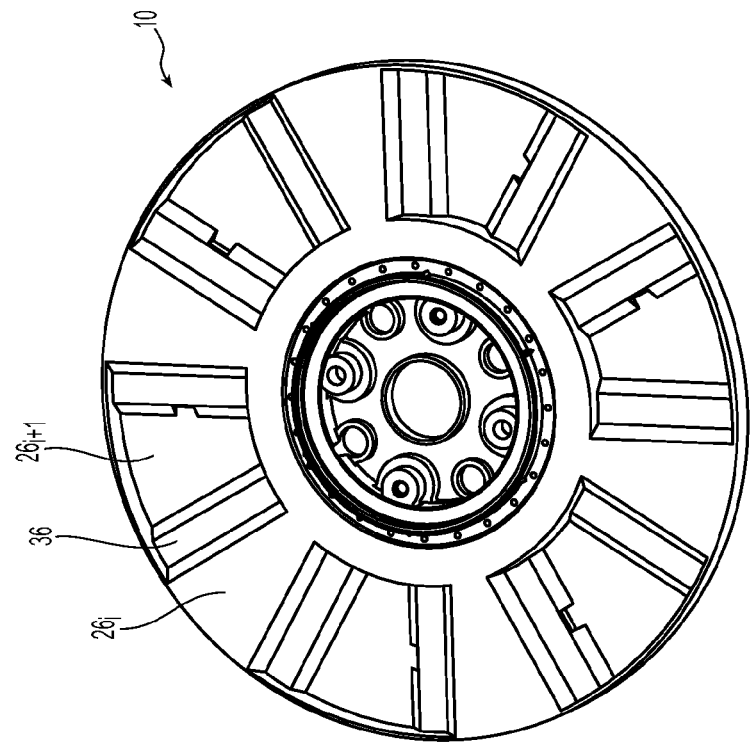
FIG. 2(b) is an isometric inside view of the inventive flange of FIG. 2(a)
Figure 2A:
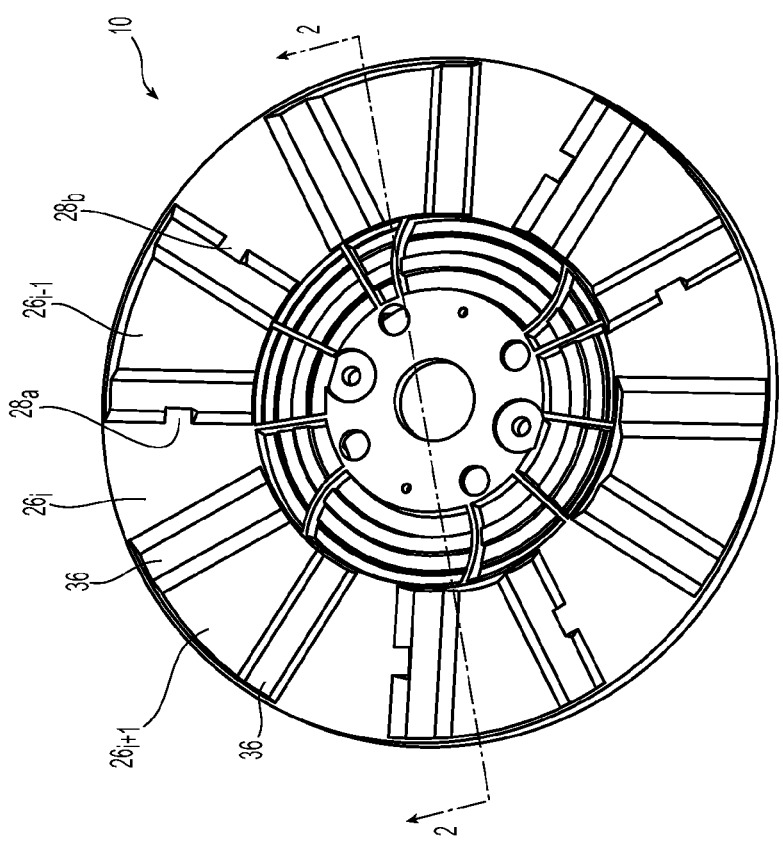
FIG. 2(a) is an isometric outside view of another inventive flange of the present invention.

Another embodiment of the present invention is illustrated in FIGS. 2(a)-(c). This embodiment is similar to the embodiment shown in FIGS. 1(a)-(e), except that supports 36 are provided between corrugation 26(i) and adjacent corrugations 26(i±1). Preferably, supports 36 are located in a plane substantially parallel to and located equal distance between corrugation 26(i) and 26(i±1). Supports 36 provide an additional amount of rigidity to flange 10 to adjust the flexibility of flange 10. A designer can vary the width of support 36 to increase or decrease its rigidity. The designer can also move support 36 away from the mid-plane towards either corrugation 26(i) or corrugations 26(i±1) to selectively provide either the outside surface or the inside surface of the reel or spool more or less flexibility/rigidity. Alternatively, supports 36 can form angle other than 180° with corrugations 26(i), i.e., supports 36 are not parallel to corrugations 26(i), as represented by support 37 in FIG. 2(d). In another embodiment, the thickness or size of supports 36 can vary in the radial direction as represented by support 35 in FIG. 2(c). As illustrated in FIG. 2(d), supports 36 can have a stepped profile from hub 12 to outer rim 14. The stepped profile can be in the radial direction, as shown, or in the circumferential direction, or in a direction that has both a radial component and a circumferential component. The profile may also be triangular.

Another embodiment of the present invention is illustrated in FIGS. 2(a)-(c). This embodiment is similar to the embodiment shown in FIGS. 1(a)-(e), except that supports 36 are provided between corrugation 26(i) and adjacent corrugations 26(i±1). Preferably, supports 36 are located in a plane substantially parallel to and located equal distance between corrugation 26(i) and 26(i±1). Supports 36 provide an additional amount of rigidity to flange 10 to adjust the flexibility of flange 10. A designer can vary the width of support 36 to increase or decrease its rigidity. The designer can also move support 36 away from the mid-plane towards either corrugation 26(i) or corrugations 26(i±1) to selectively provide either the outside surface or the inside surface of the reel or spool more or less flexibility/rigidity. Alternatively, supports 36 can form angle other than 180° with corrugations 26(i), i.e., supports 36 are not parallel to corrugations 26(i), as represented by support 37 in FIG. 2(d). In another embodiment, the thickness or size of supports 36 can vary in the radial direction as represented by support 35 in FIG. 2(c). As illustrated in FIG. 2(e), supports 36 can have a stepped profile from hub 12 to outer rim 14. The stepped profile can be in the radial direction, as shown in FIG. 2(e), or in the circumferential direction, or in a direction that has both a radial component and a circumferential component. The profile may also be triangular.

Figure 3B:
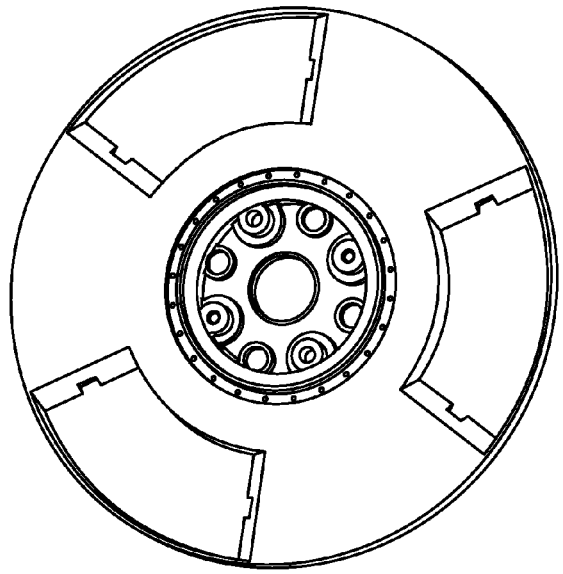
FIG. 3(b) is an isometric inside view of the inventive flange of FIG. 3(a)
Figure 3A:
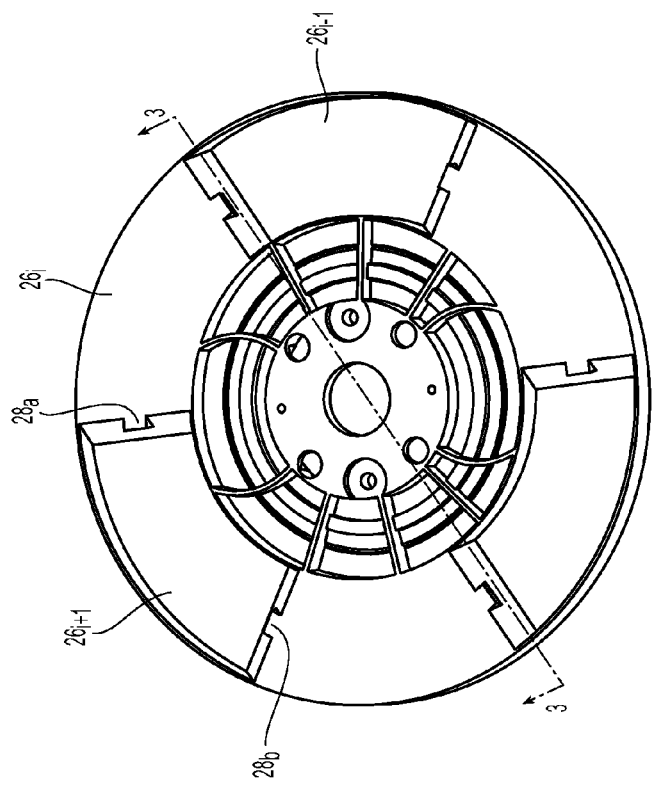
FIG. 3(a) is an isometric outside view of another inventive flange of the present invention.
Figure 3C:
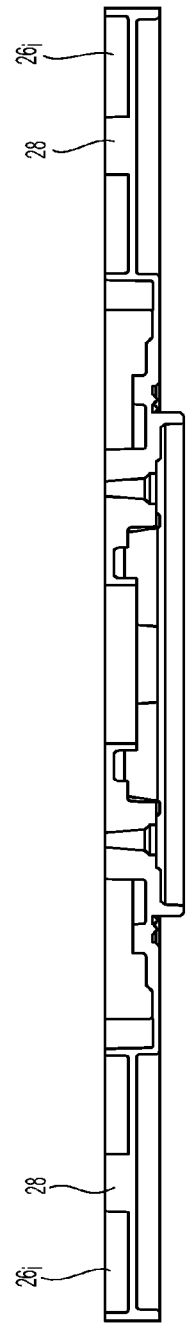
FIG. 3(c) is a cross-sectional view along line 3-3.

Another embodiment is shown in FIG. 3(a)-(c). This embodiment is similar to the embodiment shown in FIGS. 1(a)-(e), except that fewer corrugations 26 are used, and that undercut pairs 28a and 28b are present on each corrugation, as shown.

Figure 4A:
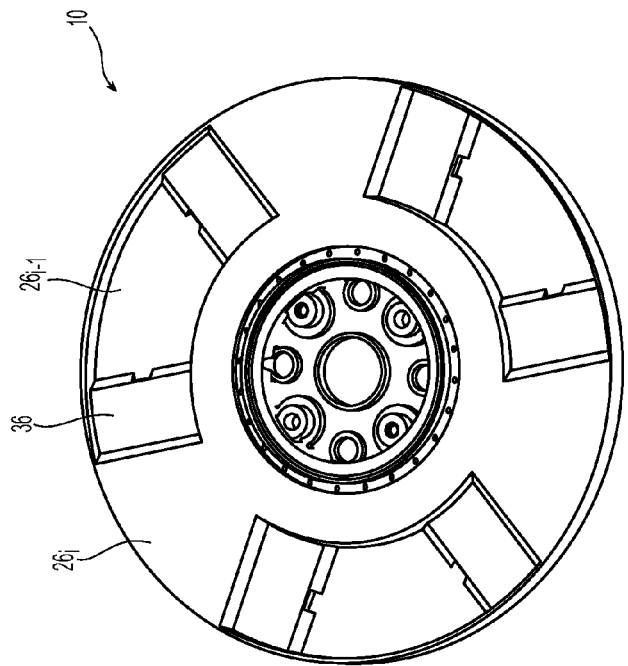
FIG. 4(a) is an isometric outside view of yet another inventive flange of the present invention.
Figure 4B:
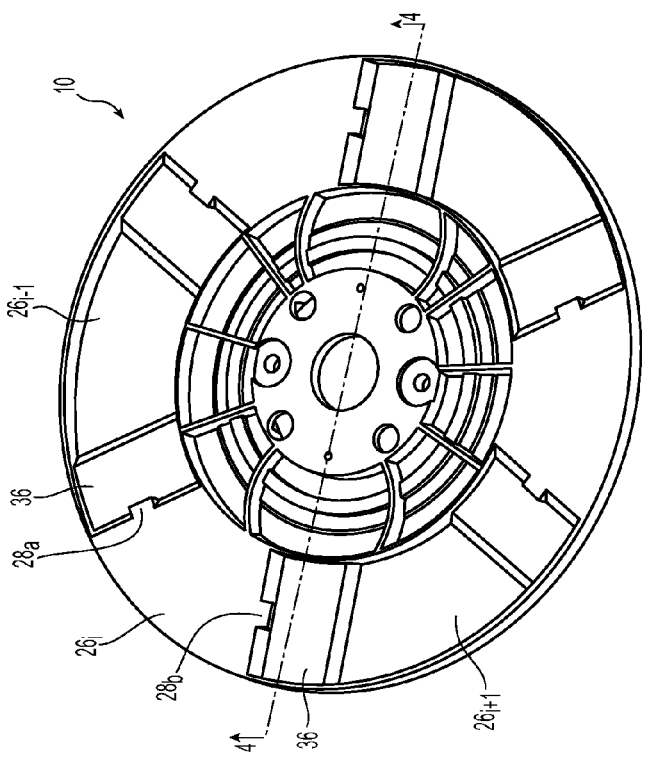
FIG. 4(b) is an isometric inside view of the inventive flange of FIG. 4(a)
Figure 4C:
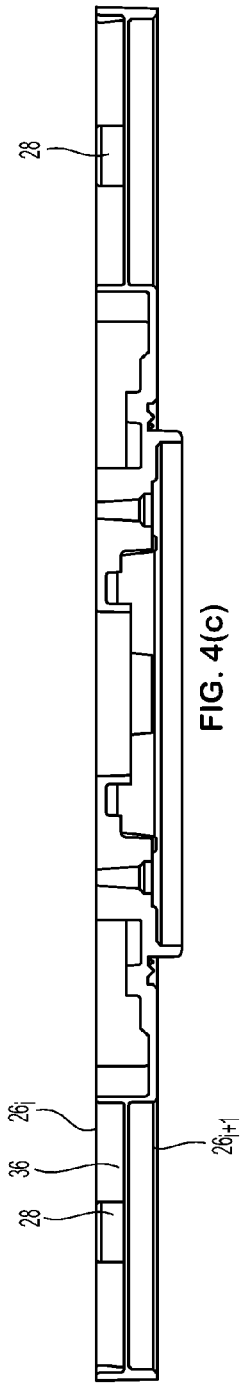
FIG. 4(c) is a cross-sectional view along line 4-4.

Another embodiment is shown in FIGS. 4(a)-(c). This embodiment is similar to the embodiment shown in FIGS. 2(a)-(c), except that fewer corrugations 26 and supports 36 are deployed.

Yet another embodiment is shown in FIGS. 5(a)-5(e). In this embodiment, the number of corrugations 26 is higher than the previous embodiments, and undercuts 28, while are still preferably distributed substantially evenly around flange 10, are arranged singly instead of in pairs. An advantage of having single undercuts 28 is that they still retain the partially solidified flange 10 to a predetermined mold half during mold separation, and it is easier to eject flange 10 with ejection pins.

Figure 5E:
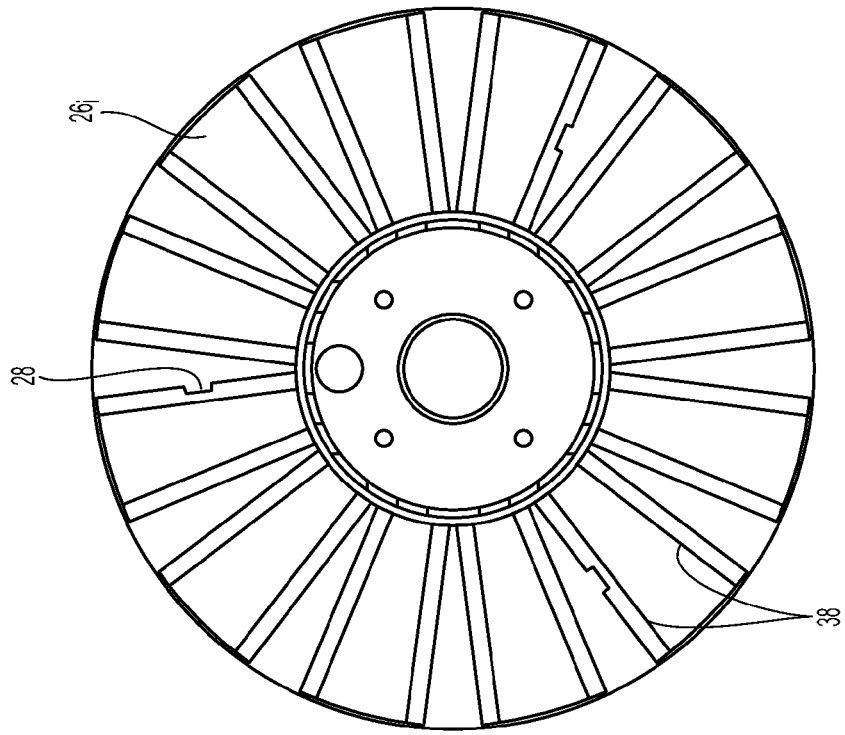
FIG. 5(e) is a front inside view of the inventive flange of FIG. 5(b)
Figure 5D:
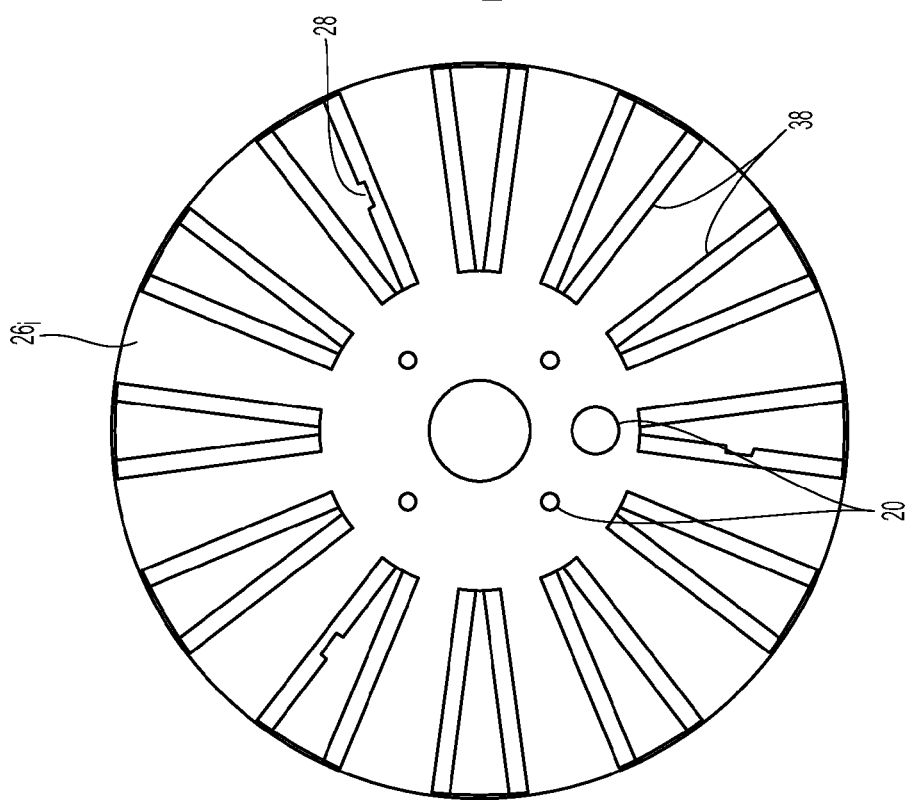
FIG. 5(d) is a front outside view of the inventive flange of FIG. 5(a)
Figure 6B:
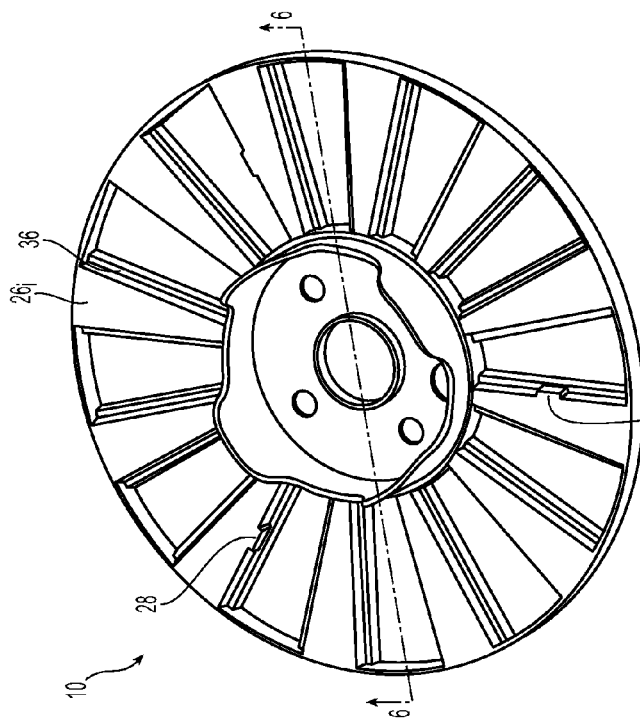
FIG. 6(b) is an inside isometric view of the inventive flange of FIG. 6(a)
Figure 6A:
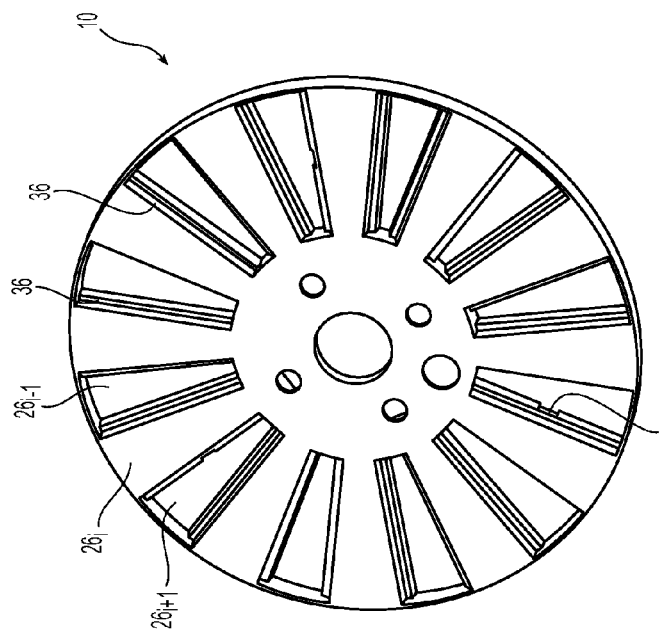
FIG. 6(a) is an outside isometric view of another inventive flange of the present invention.
Figure 6C:
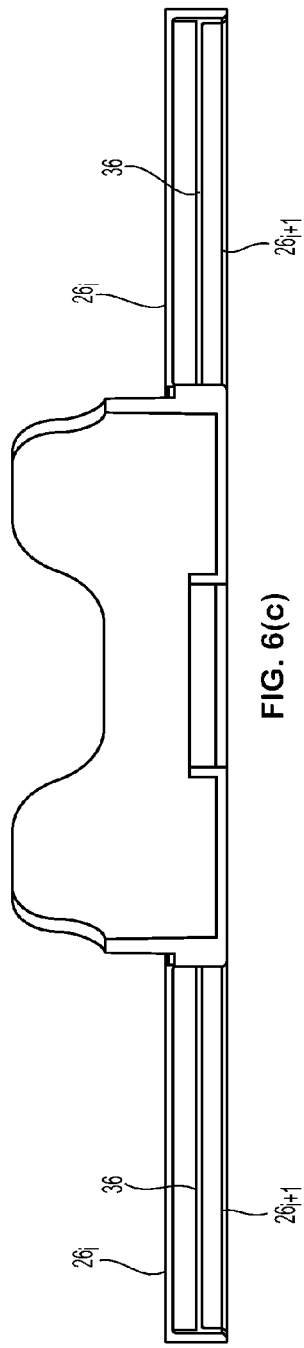
FIG. 6(c) is a cross-sectional view of the along line 6-6.
Figure 6D:
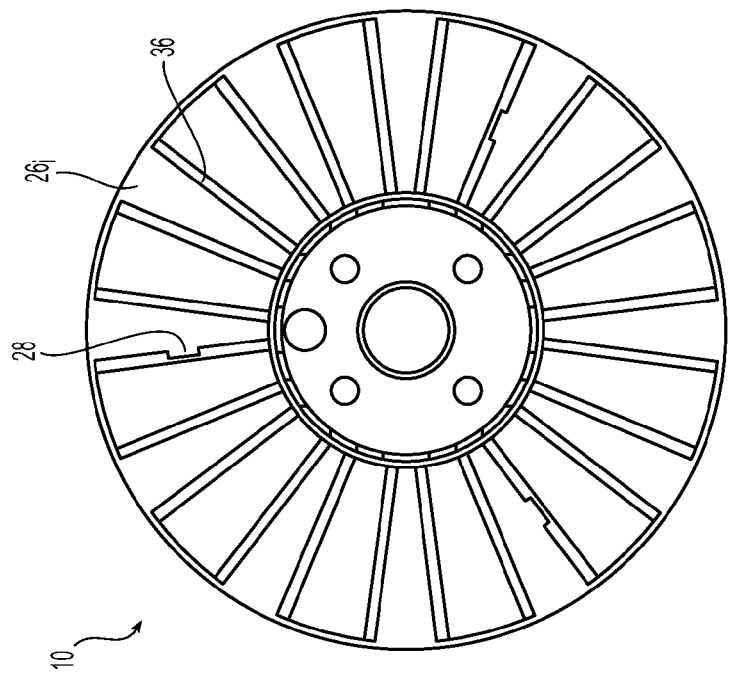
FIG. 6(d) is a front outside view of the inventive flange of FIG. 6(a)
Figure 6E:
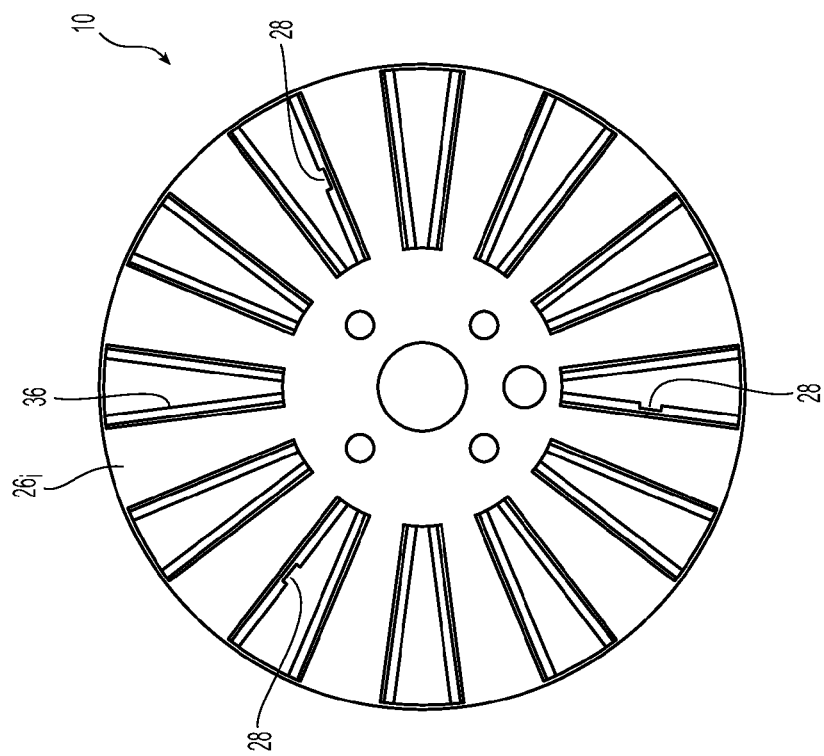
FIG. 6(e) is a front inside view of the inventive flange of FIG. 6(b).

Preferably, as best shown in FIGS. 5(d)-5(e) radial lines 38 forming or demarcating corrugations 26 converge at the center of flange 10. However, these radial lines can converge at other locations or multiple locations.

Referring to FIGS. 6(a)-6(e), this embodiment combines the features of the embodiment shown in FIGS. 5(a)-5(e) with single undercuts 28, and the embodiments shown in FIGS. 2(a)-2(c) and 4(a)-4(c) with supports 36. This embodiment has supports 36 disposed between adjacent corrugations 26, albeit the width of supports 36 in the circumferential direction is thinner. Again, supports 36 are provided to give flange 10 more structural strength.

While it is apparent that the illustrative embodiments of the invention disclosed herein fulfill the objectives stated above, it is appreciated that numerous modifications and other embodiments may be devised by those skilled in the art. Furthermore, features from one or more embodiments can be used with features from other embodiments. Therefore, it will be understood that the appended claims are intended to cover all such modifications and embodiments, which would come within the spirit and scope of the present invention.

I claim:

1. A single-piece flange adapted to be a part of a reel comprising:

a hub portion defining one or more aperture and an outer rim with a side wall disposed therebetween, wherein the side wall comprises a plurality of alternating radial corrugations, wherein at least one pair of adjacent corrugations comprise different and substantially parallel first and second planes, and at least one undercut disposed on a wall connecting said first and second planes.

2. The flange of claim 1 further comprising a plurality of undercuts wherein each undercut is disposed on a separate wall connecting adjacent corrugations.

3. The flange of claim 2, wherein the plurality of undercuts are located at a substantially equal distance in a radial direction.

4. The flange of claim 2, wherein the plurality of undercuts are substantially evenly distributed in a circumferential direction.

5. The flange of claim 1, wherein said at least one corrugation of said one pair of adjacent corrugations comprises a trapezoidal shape in a circumferential direction.

6. The flange of claim 1, wherein the undercut forms an angle, alpha, with one corrugation of said one pair of adjacent corrugations and wherein alpha is less than about 75°.

7. The flange of claim 6, wherein alpha is less than about 80°.

8. The flange of claim 6, wherein alpha is less than about 85°.

9. The flange in accordance to claim 1 wherein the side wall further comprises at least one radial support disposed between adjacent corrugations.

10. The flange of claim 1, wherein said wall connecting said first and second planes is a stepped wall.

11. A flange adapted to be a part of a reel comprising:
a hub portion defining one or more aperture and an outer rim with a side wall disposed therebetween, wherein the side wall comprises a plurality of alternating radial corrugations and at least one radial support disposed between adjacent corrugations wherein said adjacent corrugations are located on different and substantially parallel first and second planes and wherein said radial support comprises a different third plane that forms a step between the first and second planes.

12. The flange of claim 11, wherein the radial support is located about half the distance between two adjacent corrugations.

13. The flange of claim 11, wherein the third plane of the radial support forms an angle other than 180° with the first and second planes.

14. The flange of claim 11, wherein the at least one radial support forms a part of a stepped profile in a radial direction.

15. The flange of claim 11, wherein the radial support has varying size of thickness in a radial direction.

16. The flange of claim 11, wherein the third plane of the radial support is substantially parallel to the first and second planes.

17. The flange of claim 11, wherein a width of the third plane of said radial support is substantially less than said a width of the first or second plane.

* * * * *